United States Patent
Wang

(10) Patent No.: US 9,385,597 B2
(45) Date of Patent: Jul. 5, 2016

(54) MULTI-MODE CURRENT-ALLOCATING DEVICE

(71) Applicant: ACBEL POLYTECH INC., New Taipei (TW)

(72) Inventor: Jin-Biau Wang, New Taipei (TW)

(73) Assignee: ACBEL POLYTEC INC., New Taipei ( * ) Notice: Subject to any disclaimer, the term of this patent is extended or adjusted under 35 U.S.C. 154(b) by 501 days.

(21) Appl. No.: 14/027,144

(22) Filed: Sep. 13, 2013

(65) Prior Publication Data

US 2015/0076910 A1    Mar. 19, 2015

(51) Int. Cl.
*H02M 3/156* (2006.01)
*H02J 1/10* (2006.01)
*H02J 1/04* (2006.01)

(52) U.S. Cl.
CPC .............. *H02M 3/156* (2013.01); *H02J 1/04* (2013.01); *H02J 1/10* (2013.01); *Y10T 307/549* (2015.04)

(58) Field of Classification Search
CPC ....... H02J 1/04; Y10T 307/549; H02M 3/156
See application file for complete search history.

(56) References Cited

U.S. PATENT DOCUMENTS

| | | | | |
|---|---|---|---|---|
| 6,246,222 B1 * | 6/2001 | Nilles | ................. | H02M 3/1584 323/283 |
| 6,714,425 B2 * | 3/2004 | Yamada | ............. | H02M 1/4225 363/21.12 |
| 7,259,972 B2 * | 8/2007 | Yang | ................. | H02M 3/33507 363/21.13 |
| 7,501,715 B2 * | 3/2009 | Saeueng | ........... | H02M 3/33561 307/34 |
| 7,541,793 B2 * | 6/2009 | Saeueng | ................. | H02J 1/102 307/43 |
| 8,194,419 B2 * | 6/2012 | Ryu | ..................... | H02M 1/4208 363/21.04 |
| 8,853,957 B2 * | 10/2014 | Ge | ..................... | H05B 33/0815 315/247 |
| 2006/0017424 A1 * | 1/2006 | Wood | .................... | H02M 3/156 323/274 |
| 2010/0026250 A1 * | 2/2010 | Petty | .................... | H02M 3/156 323/271 |
| 2014/0049108 A1 * | 2/2014 | Hsu | .......................... | H02J 3/06 307/52 |

* cited by examiner

*Primary Examiner* — Thienvu Tran
*Assistant Examiner* — Pinping Sun
(74) *Attorney, Agent, or Firm* — Pai Patent & Trademark Law Firm; Chao-Chang David Pai

(57) ABSTRACT

A multi-mode current-allocating device serves to control the DC to DC converter in each power supply device of a distributive power supply system. The multi-mode current-allocating device has an active current-sharing control circuit, a current-allocating bypass circuit, and a droop current sharing control circuit to be selectively operated under an active current-sharing mode, a current-allocating mode or a droop current-sharing mode according to the factors of the type of input power of each power supply device, the state of system load, and the system reliability so as to maintain the power supply efficiency of entire power supply system and reduce unnecessary power loss.

12 Claims, 10 Drawing Sheets

MULTI-MODE CURRENT-ALLOCATING DEVICE

BACKGROUND OF THE INVENTION

1. Field of the Invention

The present invention relates to a multi-mode current-allocating device, and more particularly to a multi-mode current-allocating device serving to coordinate and allocate power supplied by multiple parallel-connected server power supplies.

2. Description of the Related Art

With reference to FIG. 12, a parallel power supply system has multiple power supply devices 1 connected with each other in parallel. Each power supply device 1 receives an input voltage Vin and supplies a rated output voltage Vo to a load. When any of the power supply devices fails, the rest of power supply devices can still normally supply power to the load. The advantage of the parallel power supply system resides in higher system reliability, high operation efficiency and easy replacement and repair of individual parts.

Each power supply device 1 has a pre-stage power supply circuit 101, a post-stage power supply circuit 102, a pre-stage control circuit corresponding to the pre-stage power supply circuit 101, and a post-stage control circuit corresponding to the post-stage power supply circuit 102. The pre-stage power supply circuit 101 converts an input voltage Vin into a bus bar voltage V1, and is composed of an AC (Alternating Current) to DC (Direct Current) converter with a power factor correction (PFC) function. The post-stage power supply circuit 102 converts the bus bar voltage V1 into an output voltage Vo, and is composed of a DC to DC converter.

To ensure proper coordination and operation among the power supply devices 1, the post-stage control circuit is responsible for current-sharing operation such that the power supply devices 1 supply an equivalent current. However, conventional power supply devices 1 are designed to merely perform a single control mode. For example, as far as active current sharing control is concerned, there are control modes, such as automatic master current-sharing control, average current-sharing control, and the like. Hardware of the foregoing control circuit can only be adapted to a corresponding control mode. Should a different control mode be desired, the foregoing control circuit must be re-designed again.

Moreover, while the load is turning into a light-loading state, if the original current-sharing control mode remains for the power supply devices 1 to supply an equivalent current, not only does each power supply device 1 have a low power supply efficiency, but also the entire power supply system has an deteriorating operation efficiency and the overall power loss tends to be high.

SUMMARY OF THE INVENTION

An objective of the present invention is to provide a multi-mode current-allocating device activating corresponding circuits to select suitable control mode(s) according to the state of load, the type and state of input power, operation efficiency and system reliability.

To achieve the foregoing objective, the multi-mode current-allocating device serves to control a DC (direct current) to DC converter of a power supply device, and has a current switch, a feedback circuit, a current-sharing bypass circuit, a droop current sharing control circuit, and a MCU.

The current switch is connected to an output terminal of the DC to DC converter. An output voltage before passing through the current switch is defined as a front-switch output voltage, and the output voltage after passing through the current switch is defined as an after-switch output voltage.

The feedback circuit is connected between the output terminal and an input terminal of the DC to DC converter, and has an internal feedback circuit and an external feedback circuit.

The internal feedback circuit has a first resistor and a second resistor. The second resistor is connected in series to the first resistor. A first end of the second resistor is connected to the front-switch output voltage. A series-connected node between the first resistor and the second resistor is a voltage-dividing feedback node having a voltage-dividing feedback voltage.

The external feedback circuit has a far-end feedback resistor and a third resistor.

A first end of the far-end feedback resistor is connected to the after-switch output voltage.

A first end of the third resistor is connected to a second end of the far-end feedback resistor, and a second end of the third resistor is connected to the voltage-dividing feedback resistor.

The current-allocating bypass circuit has a second diode and a second bypass amplification circuit.

An anode of the second diode is connected to the second end of the far-end feedback resistor and the first end of the third resistor.

An output terminal of the second bypass amplification circuit is connected to a cathode of the second diode, and an input terminal of the second bypass amplification circuit receives a first control voltage.

A droop current sharing control circuit has a fourth resistor and a voltage amplification circuit.

One end of the fourth resistor is connected to the voltage-dividing feedback node of the feedback circuit.

An output terminal of the voltage amplification circuit is connected to the other end of the fourth resistor, and an input terminal of the voltage amplification circuit receives a second control voltage for the voltage amplification circuit to output a droop control voltage to the feedback circuit through the fourth resistor.

An input terminal of the MCU is connected to the front-switch output voltage, the after-switch output voltage, and a communication interface, and the MCU provides the first control voltage and the second control voltage.

From the foregoing circuit structure, the present invention can control the turn-on/turn-off state of the first to fourth switches and the current-sharing bus switch according to the system operation demand for the current-allocating device to be operated under an active current sharing mode or a droop current sharing mode, thereby providing a combined current control. A relationship between the states of each switch and the modes of circuit operation are listed below.

Accordingly, when multiple power supply devices are connected in parallel to constitute a power supply system, each power supply device can control the turn-on/turn-off states of the switches to activate an appropriate operation mode according to the AC/DC type of the input power and the state of load, and is not subject to the limitation of a single control circuit capable of performing a single operation mode.

| | First Switch A1 | Second Switch A2 | Third Switch B1 | Fourth Switch B2 | Current-Sharing Bus Switch 22 |
|---|---|---|---|---|---|
| Active Current Sharing Mode | OFF | OFF | OFF | OFF | ON |

-continued

|  | First Switch A1 | Second Switch A2 | Third Switch B1 | Fourth Switch B2 | Current-Sharing Bus Switch 22 |
|---|---|---|---|---|---|
| Current-Allocating Mode (upward adjustment) | ON | OFF | OFF | OFF | OFF |
| Current-Allocating Mode (downward adjustment) | OFF | ON | ON | OFF | OFF |
| Droop Current Sharing Mode | OFF | OFF | OFF | ON | OFF |

Other objectives, advantages and novel features of the invention will become more apparent from the following detailed description when taken in conjunction with the accompanying drawings.

DETAILED DESCRIPTION OF THE INVENTION

Figure 1:
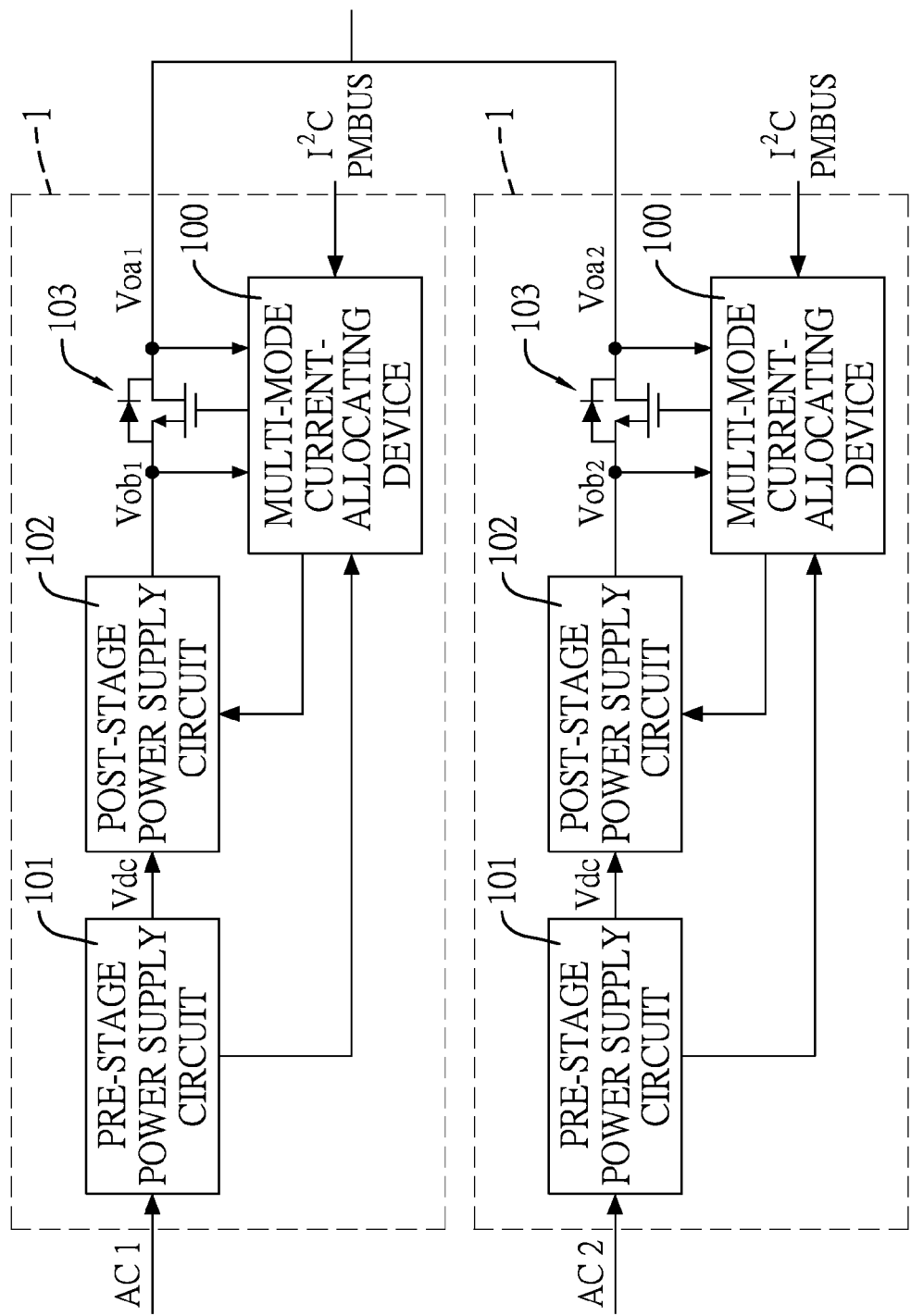
FIG. 1 is a functional block diagram of a redundant power supply system having two power supply devices connected in parallel respectively connected to two AC power inputs in accordance with the present invention.

With reference to FIG. 1, multiple power supply devices 1 are connected in parallel to form a redundant power supply system. Each power supply device 1 at least has a DC to DC converter. In the present embodiment, each power supply device 1 has a pre-stage power supply circuit 101 and a post-stage power supply circuit 102. The pre-stage power supply circuit 101 converts an input voltage AC1, AC2 into a DC bus bar voltage Vdc, and may usually be a DC to DC converter with a PFC function. The post-stage power supply circuit 102 converts the DC bus bar voltage Vdc into an output voltage, and may usually be a DC to DC converter.

A multi-mode current-allocating device 100 is mounted inside each power supply device 1 to control the post-stage power supply circuit 102 inside the power supply device 1. An output terminal of the post-stage power supply circuit 102 is connected to a power bus of the power supply system through an Oring switch 103. The Oring switch 103 may be an Oring diode or an Oring MOSFET (Metal Oxide Semiconductor Field Effect Transistor). The output voltage of the post-stage power supply circuit 102 is defined as a before-switch output voltage Vobi before passing through the Oring switch 103, and as an after-switch output voltage Voai after passing through the Oring switch 103. The subscript "i" in Vobi and Voai represents the $i^{th}$ power supply device 100, and Vobi represents the before-switch output voltage of the $i^{th}$ power supply device.

The Oring switch 103 serves for current to unidirectionally flow to a load. When the after-switch output voltage Voai is greater than the before-switch output voltage Vobi, the Oring switch 103 turns off to prevent current to flow in a reverse direction. When the before-switch output voltage Vobi is greater than the after-switch output voltage Voai, the parasite diode of the Oring switch 103 naturally turns on to output current, and then the Oring switch 103 turns on to reduce the turn-on loss.

Figure 2:
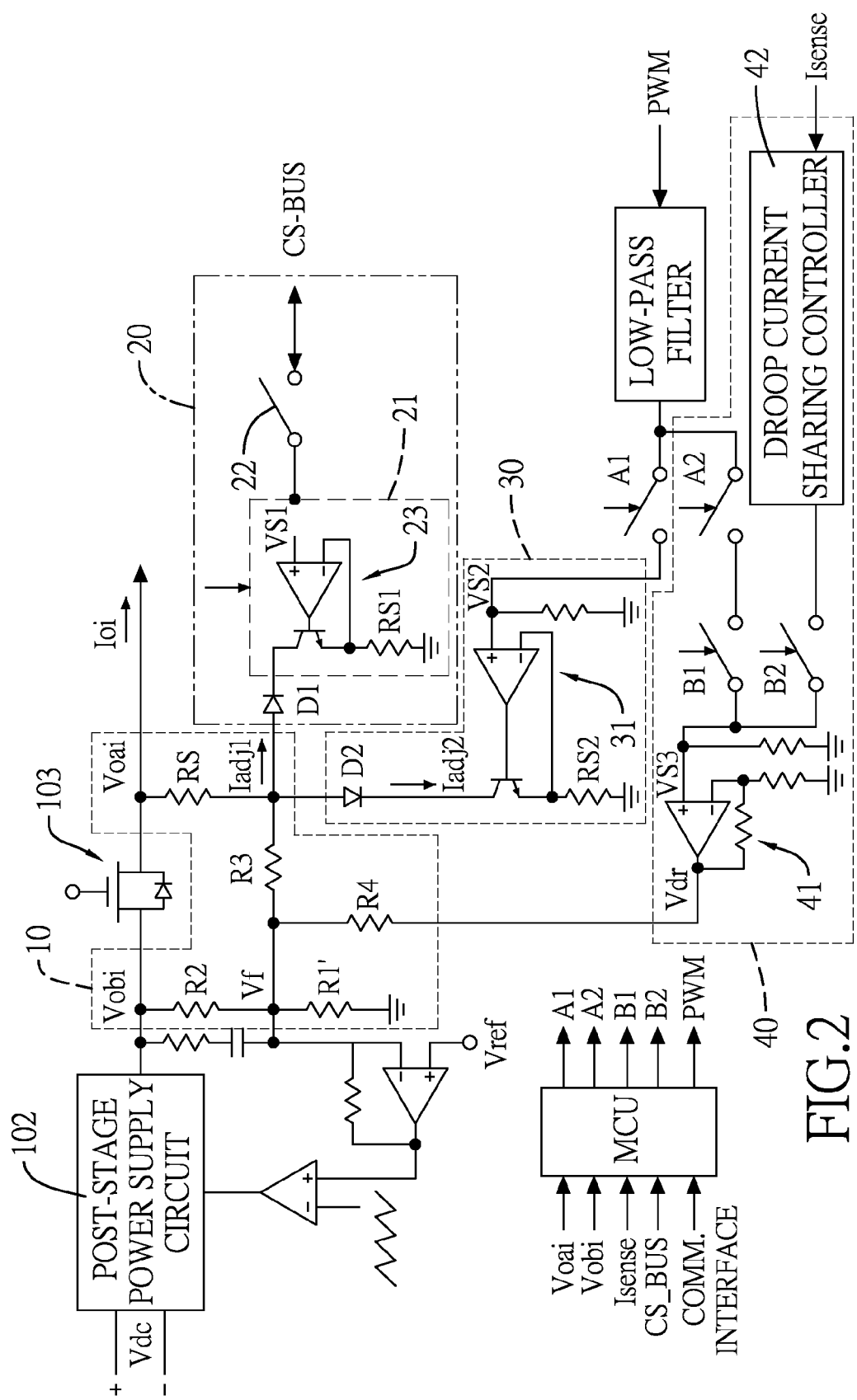
FIG. 2 is a circuit diagram of a first embodiment of a current-allocating device in each power supply device in FIG. 1.

With reference to FIG. 2, the current-allocating device 100 has a feedback circuit 10, an active current-sharing control circuit 20, a current-allocating bypass circuit 30, and a droop current sharing control circuit 40.

The feedback circuit 10 is connected between an input terminal and the output terminal of the post-stage power supply circuit 102. According to the before-switch output voltage Vobi and the after-switch output voltage Voai, a control signal is fed back to the post-stage power supply circuit 103. The feedback circuit 10 has an internal feedback circuit and an external feedback circuit for weight-adjusting internal feedback voltage and external feedback voltage. The internal feedback circuit has a first resistor R1' and a second resistor R2 connected in series to each other. A series-connected node between the first resistor R1' and the second resistor R2 is defined as a voltage-dividing feedback node. The external feedback circuit has a far-end feedback resistor RS and a third resistor R3 for compensating voltage drop arising from wire resistance. Given the internal feedback circuit and the external feedback circuit for dividing voltage, a voltage-dividing feedback voltage Vf is generated for configuring output voltage droop caused by an rated output voltage and an output current.

To achieve multi-mode output current allocating capability, two current-allocating bypass circuits are connected to a connection node connected between the far-end feedback resistor RS and the third resistor R3 to adjust output current. Furthermore, a fourth resistor R4 is connected to a connection node between the internal feedback circuit and the external feedback circuit to output a droop control voltage Vdr to the droop current sharing control circuit 40 for adjustment of output voltage droop. Other circuit blocks connected to the feedback circuit 10 are described as follows.

The active current-sharing control circuit 20 has a first diode D1, a current-sharing controller 21, a first bypass amplification circuit 23, and a current-sharing bus switch 22. The anode of the first diode D1 is connected to the voltage-dividing feedback node through the third resistor R3. A current-sharing command of the current-sharing controller 21 is connected to one end of the current-sharing bus switch 22. The other end of the current-sharing bus switch 22 is connected to a current-sharing bus. The current flowing through the first diode D1 is defined as a first adjustment current Iadj1. When the current-sharing bus switch 22 turns on, the current-sharing command or the current-sharing command of other parallel-connected power supply device is sent to the current-sharing bus to adjust the first adjustment current Iadj1 of the first bypass amplification circuit 23 and achieve the current-sharing control over each parallel-connected power supply device 1.

The first bypass amplification circuit 23 has a first operational amplifier, a first transistor, and a first adjusting resistor RS1. An output terminal of the first operational amplifier is connected to a base of the first transistor, an inverting input terminal of the first operational amplifier is connected to the emitter of the first transistor, and a non-inverting input terminal of the first operational amplifier is connected to the output control voltage VS1 of the current-sharing controller 21. The collector of the first transistor is connected to the cathode of the first diode D1. The first bypass amplification circuit 23 serves to use the output control voltage VS1 of the current-sharing controller 21 to control the first adjustment current Iadj1, which is expressed as follows:

$$Iadj1 = VS1/RS1$$

The active current-sharing control circuit 20 may be a UCC39002 current-sharing control integrated circuit (IC) or other equivalent ICs.

The current-allocating bypass circuit 30 has a second diode D2 and a second bypass amplification circuit 31. The second bypass amplification circuit 31 has a second operational amplifier, a second transistor, and a second adjusting resistor RS2. An output terminal of the second operational amplifier is connected to a base of the second transistor, an inverting input terminal of the second operational amplifier is connected to the emitter of the second transistor, and a non-inverting input terminal of the second operational amplifier is connected to a control voltage VS2. The collector of the second transistor is connected to the cathode of the second diode D2. The second bypass amplification circuit 31 serves to use the control voltage VS2 to directly control a second adjustment current Iadj2, which is expressed as follows:

$$Iadj2 = VS2/RS2$$

The far-end feedback resistor RS is connected between the after-switch output voltage Voai and the anode of the first diode D1. The anode of the second diode D2 is connected to the far-end feedback resistor RS and the anode of the first diode D1. The cathode of the second diode D2 is connected to the second bypass amplification circuit 31. The current flowing through the second diode D2 is defined as the second adjustment current Iadj2. The non-inverting input terminal of the second amplifier receives the control voltage VS2 through a first switch A1. In the present embodiment, the control voltage VS2 is an analog voltage signal being a PWM (Pulse Width Modulation) signal outputted from a microprocessor and processed by a low-pass filter. Based on energy and efficiency requirements, the power supply system can notify the microprocessor through a communication interface, such as I²C or PMBus, to adjust the pulse width of the PWM signal and the second adjustment current Iadj2 for the purpose of allocating current.

The droop current sharing control circuit 40 has a droop current sharing controller 42, a second switch A2, a third switch B1, a fourth switch B2, and a voltage amplification circuit 41. The droop control voltage Vdr generated by the droop current sharing control circuit 40 is outputted to the feedback circuit 10 through the fourth resistor R4 for an output voltage to be dropped with the adjustment of an output current. One end of the fourth resistor R4 is connected to the voltage-dividing feedback node, and the other end of the fourth resistor R4 is connected to an output terminal of the voltage amplification circuit 41. An input terminal of the voltage amplification circuit 41 is connected to one terminal of the third switch B1 and one terminal of the fourth switch B2. Another terminal of the third switch B1 is connected to the control voltage through the second switch A2. Another terminal of the fourth switch B2 receives a droop current sharing control signal issued from the droop current sharing controller 42. The droop current sharing control signal is generated according to a sensing current Isense.

According to an operating demand of the power supply system, the turn-on/turn-off state of the first to fourth switches A1, A2, B1, B2 can be controlled for the current-allocating device 100 to be operated under an active current sharing mode, a droop current sharing mode or an output current allocating mode, thereby providing multi-mode current control. Listed below is a table referring to relationship between the states of each switch and different operation modes of the current-allocating device 100.

|  | First Switch A1 | Second Switch A2 | Third Switch B1 | Fourth Switch B2 | Current-Sharing Bus Switch 22 |
|---|---|---|---|---|---|
| Active Current Sharing Mode | OFF | OFF | OFF | OFF | ON |
| Current-Allocating Mode (upward adjustment) | ON | OFF | OFF | OFF | OFF |
| Current-Allocating Mode (downward adjustment) | OFF | ON | ON | OFF | OFF |
| Droop Current Sharing Mode | OFF | OFF | OFF | ON | OFF |

A. Active Current Sharing Mode

When the current-allocating device 100 is operated under the active current sharing mode, regular current-sharing control methods, such as master slave current-sharing method, average current-sharing method, and the like, can be performed. The current-sharing controller 21 outputs the control voltage VS1 to the first bypass amplification circuit 23 to adjust the first adjustment current Iadj1, $$\text{where } Iadj1 = \frac{Vs1}{Rs1}$$

A steady-state operating point of the output voltage now can be determined by the following equation.

$$Vref = Vobi \frac{R1 // (R3 + Rs)}{R2 + R1 // (R3 + Rs)} + \qquad (1)$$
$$Voai \frac{R1 // R2}{R1 // R2 + R3 + Rs} - Iadj1 \times Rs \frac{R1 // R2}{R1 // R2 + R3 + R2}$$

$$Voai = \begin{cases} Vobi - Ioi \times Rds, & \text{Oring } MOSFET(\text{ON}) \\ Vobi - Vf, & \text{Oring } MOSFET(\text{OFF}) \end{cases} \qquad (2)$$

where R1 represents a resistance value of the first resistor R1' and the fourth resistor R4 connected in parallel. The droop control voltage Vdr and the control voltage VS2 are both zero at the moment.

The after-switch output voltage Voai can be solved with the simultaneous equations (1) and (2).

Besides, when the Oring MOSFET 103 turns on, Vref can be obtained by substituting Voai in Equation (2) into Equation (1).

$$Vref = Vobi\frac{R1}{(R2 // (R3 + Rs)) + R1} + \tag{3}$$
$$(-Ioi \times Rds - Iadj1 \times Rds)\frac{R1 // R2}{R1 // R2 + R3 + Rs}$$
$$= W1 \times Vobi + W2 \times (-Ioi \times Rds - Iadj1 \times Rds)$$

where $$W1 = \frac{R1}{(R2 // (R3 + Rs)) + R1}, \quad W2 = \frac{R1 // R2}{R1 // R2 + R3 + Rs}$$

Suppose that a disturbance analysis is used to analyze small signal model under the control mode. When $Iadj1 = Iadj1^O + \Delta Iadj1$, in which $\Delta Iadj1$ is an increment, $Vobi = Vobi^O + \Delta Vobi$. The reference voltage command Vref remains unchanged. The superscript "O" represents an original operating point. Under the circumstance of closed loop feedback control, a small signal variation can be obtained as follows by substituting the increment into Equation (3) and eliminating the term associated with the steady-state operating point.

$$\Delta Vobi = \frac{(\Delta Iadj1 \times Rs + \Delta Ioi \times Rds) \times W2}{W1} \tag{4}$$

Figure 3:
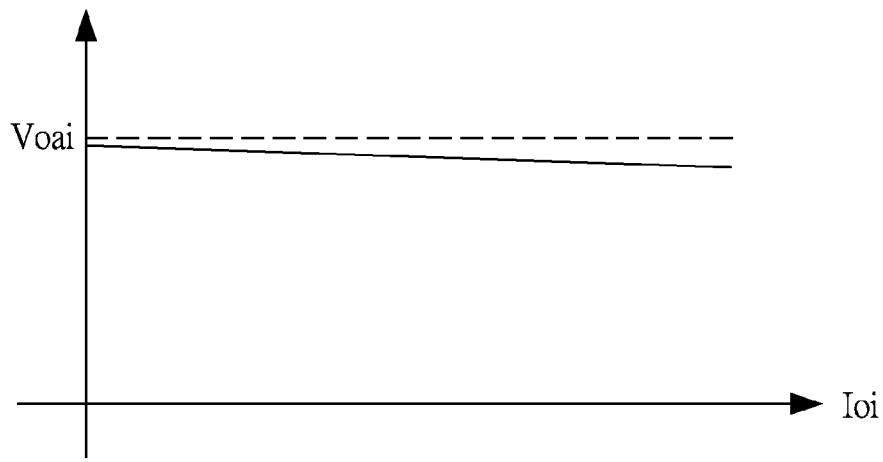
FIG. 3 is a current-voltage curve showing relationship between after-switch output voltage Voai and output current Ioi of a typical power supply device characterized by voltage differences between a solid line and a dotted line indicative of voltage drop arising from output wire resistance.

From Equation (4), adjusting the first adjustment current Iadj1 upwards will cause the increase of the before-switch output voltage Vobi, which also increases the output current Ioi. Hence, the term, $\Delta Ioi \times Rds$, in Equation (4) increases and leads to the increase of the after-switch output voltage Vobi. As far-end feedback has the nature of positive feedback, the dropping speed of the after-switch output voltage can be slowed down as shown in FIG. 3 when the output current Ioi increases. The term, $\Delta Iadj1 \times Rs) \times (W2/W1)$ in equation (4) can normally provide a voltage headroom in a range of 0~200 mV for varying the value of the output current Ioi.

B1: Current-Allocating Mode (Upward Adjustment)

Although the first adjustment current Iadj1 in collaboration with the active current-sharing mode can achieve the current-sharing effect on the parallel-connected power supply devices 1 during the steady state to supply power in a highly reliable manner, the drawback is that the overall operation efficiency is not high. The highest efficiency of a single power supply device 1 occurs at 50% of the rated output power. When multiple parallel-connected power supply devices 1 adopt the active current-sharing control under a light-loading condition, each power supply device 1 supplies power with less than 50% of the rated output power and the power supply efficiency goes down. Under the circumstance, the current-allocating mode with upward adjustment of the output voltage is brought into play.

During the current-allocating mode with upward adjustment of the output voltage, the current-sharing bus switch 22 is turned off to let the first adjustment current Iadj1 become zero. A microprocessor unit (MCU) is used to generate a PWM signal that passes the low-pass filter to provide a control signal VS2 to the input terminal of the first bypass amplification circuit 31 for controlling the second adjustment current Iadj2, which is expressed by Iadj2=VS2/RS2. To obtain a steady-state operating point of the output voltage, Iadj1 just needs to be replaced by Iadj2 as expressed in the following equation.

$$Vref = Vobi\frac{R1 // (R3 + Rs)}{R2 + R1 // (R3 + Rs)} + \tag{1'}$$
$$Voai\frac{R1 // R2}{R1 // R2 + R3 + Rs} - Iadj2 \times Rs\frac{R1 // R2}{R1 // R2 + R3 + R2}$$

$$Vobi = \begin{cases} Ioi \times Rds + Voai, & Oring\ MOSFET(ON) \\ Voai + Vf, & Oring\ MOSFET(OFF) \end{cases} \tag{2'}$$

$$\Delta Vobi = \frac{(\Delta Iadj2 \times Rs + \Delta Ioi \times Rds) \times W2}{W1} \tag{3'}$$

According to Equation (4'), when Iadj2 increases, the before-switch output voltage Vobi also increases, and the output current Ioi increases. Hence, given the PWM signal outputted from the MCU, the purpose of increasing the output voltage and the output current can be attained.

B2: Current-Allocating Mode (Downward Adjustment)

As the upward adjustment of Iadj1 and Iadj2 can only achieve to increase the output voltage, to effectively adjust the output current while maintaining the output voltage within a reasonable adjustment range, the output current of certain parallel-connected power supply devices 1 should be lowered, if necessary. The droop current-sharing circuit 40 serves to fit the need of decreasing the output voltage.

During the current-allocating mode with downward adjustment of the output voltage, similarly, the current-sharing bus switch 22 is turned off to let the first adjustment current Iadj1 become zero. As the first switch A1 is turned off, the control voltage VS2 is not inputted, and the second adjustment current Iadj2 is zero. After passing through the low-pass filter, the PWM signal provided by the MCU further passes through the second switch A2 and the third switch B1, which are both turned on, to provide a voltage signal VS3 to the non-inverting input terminal of the voltage amplification circuit 41 of the droop current-sharing control circuit 40, so that the output terminal of the voltage amplification circuit 41 generates the droop control voltage Vdr.

According to FIG. 2, the reference voltage command Vref can be obtained by the following equation.

$$Vref = Vobi\frac{R1 // (R3 + Rs)}{R2 + R1 // (R3 + Rs)} + \tag{7}$$
$$Voai\frac{R1 // R2}{R1 // R2 + R3 + Rs} + Vdr\frac{R1' // R2 // (R3 + Rs)}{R4 + (R3 + Rs) // R1' // R2}$$

After Voai is substituted into Equation (7), Equation (7) can be expressed as follows.

$$Vref = Vobi \times W1 - Ioi \times Rds \times \frac{R1 // R2}{R1 // R2 + (R3 + Rs)} +$$
$$Vdrs\frac{R1' // R2 // (R3 + Rs)}{R4 + (R3 + Rs) // R1' // R2}$$

Similarly, the disturbance analysis is used to analyze small signal model under the control mode. When the droop control voltage Vdr is expressed by $Vdr = Vdr^O + \Delta Vdr$, in which $\Delta Vdr$ represents an increment, then $Vobi = Vobi^O + \Delta Vobi$, in which "O" represents the original operating point, under the condition that the reference voltage command remains unchanged. Under the closed loop feedback control, after the foregoing terms containing the value at the original operating point and the increment is substituted into Equation (7) and the terms at the original operating point are cancelled, the following expression can be obtained.

$$0 = \Delta Vobi \times W1 - \Delta Ioi \times Rds \times W2 + \Delta Vdr \times W3$$

A small signal variation of the output voltage can be expressed as follows.

$$\Delta Vobi = \frac{1}{W1}(\Delta Ioi \times Rds \times W2 - \Delta Vdr \times W3) \quad (8)$$

where $$W3 = \frac{R1' // R2 // (R3 + Rs)}{R4 + (R3 + Rs) // R1' // R2}$$

According to Equation (8), when the droop control voltage Vdr increases, $\Delta Vdr$ increases and the before-switch output voltage Vobi decreases such that the purpose of decreasing the output voltage is attained.

Given the two parallel-connected power supply devices 1 in FIG. 1 as an example, the two power supply devices 1 evenly share the load current and each power supply device supplies 50% of the load current when the two power supply devices supply power during a full-load condition. Meanwhile, the power supply devices have the highest operation efficiency, which is approximately 93~94% as indicated by an operating point A in FIG. 4. However, when the power supply devices are in a light-load condition, for example, 50% of the full load, a current-sharing control method will allocate 50% of the load current to each power supply device 1, which is 25% of the full load as indicated by an operating point B in FIG. 4. Meanwhile, the overall operation efficiency of the two parallel-connected power supply devices is even worse than the operation efficiency of a single power supply device 1.

Therefore, under a light-load condition, the power supply system can input commands from external I²C or PMBUS to the MCU to inform each power supply device 1 of a current adjustment. Within a reasonable range of voltage adjustment, one of the two parallel-connected power supply devices 1 uses the MCU to adjust $\Delta Iadj2$ so as to increase the output voltage thereof under the current-sharing mode increasing output voltage. The other power supply device 1 adjusts $\Delta Vdr$ to decrease the output voltage thereof under the current-sharing mode with downward adjustment of the output voltage, and lets the power supply device 1 output a zero output current, so that the first power supply device with upward adjustment of the output voltage supplies entire output current and is operated at a highest operation efficiency while the other stand-by power supply device 1 only consumes the no-load loss. For a power supply device with output power in a range of 500 W to 900 W and a rated output voltage 12 V, the no-load loss is about 4~5 W. The comparison between the current-sharing mode and the current-allocating mode is described as follows.

Figure 4:
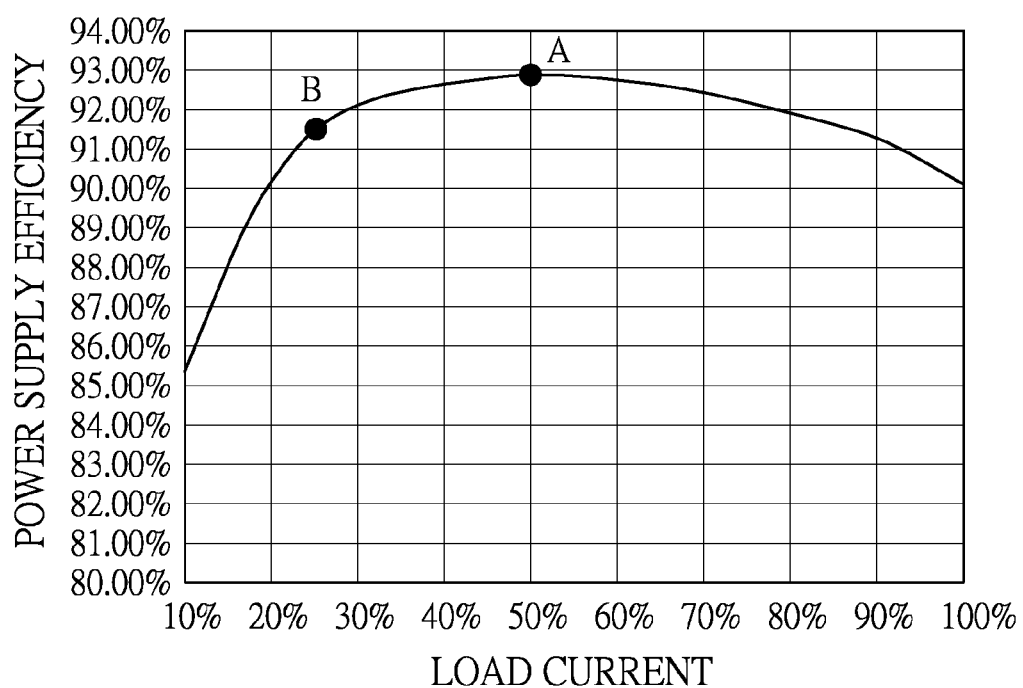
FIG. 4 is a curve showing relationship between power supply efficiency and output current to a load of each power supply device in FIG. 1.

Suppose that the highest output power Pout of each power supply 1 is 800 W and the highest system load of two parallel-connected power supply devices is 1600 W. A curve associated with the output power efficiency of a single power supply device is shown in FIG. 4, and the output power efficiency is 93% corresponding to a 50% of the output load current, which is at an operating point A.

As the usual load of the power supply system is approximately one half of the full load thereof, which is 50%, when the current-sharing technique is applied, the two parallel-connected power supply devices 1 will evenly share 50% of the full load. In other words, each power supply device 1 supplies 25% of the rated output power, which is 200 W, and has the output power efficiency 91%. The total power loss under the current-sharing mode is Ploss1=2×200 W×(1−91%)=36 W.

When one of the parallel-connected power supply devices solely supplies 400 W and the other power supply device stands by under the foregoing current-allocating mode, the total power loss is Ploss2=400*(1−93%)+5=33 W.

From the foregoing, the power saved by using the current-allocating approach is 36 W−33 W=3 W. Furthermore, when a major power supply fails or shuts down, a 12 V bus voltage thereof is thus decreased. If the Oring switch 103 is a MOSFET, the parasite diode of the Oring switch 103 of another standby parallel-connected power supply device naturally turns on to supply power instead and further triggers the MOSFET to turn on, thereby lowering power transmission loss. Accordingly, the foregoing current-allocating approach is truly a compromising control method taking both reliability and operation efficiency of the power supply system into account.

When practically applied, the power supply system adjusts the output current of the two parallel-connected power supply device 1, such as 50% for each power supply device (current-sharing), or 80% and 20%, 70% and 30% or 100% and 0% (standby) for the two power supply devices, according to all factors of operation efficiency requirement, power supply demand, life duration, and the like.

With further reference to FIG. 1, a first AC power AC1 and a second AC power AC2 respectively supply the two power supply devices 1. The first AC power AC1 and the second AC power AC2 may be the same AC power or two-loop power. If the unitary electric charge of the first AC power AC1 is more inexpensive than the second AC power AC2 or the first AC power AC1 is provided by regenerative power generation, the power supply system can dynamically assign a ratio the output current between the two power supply devices for current allocation based on a lowest electric charge lately.

Figure 5:
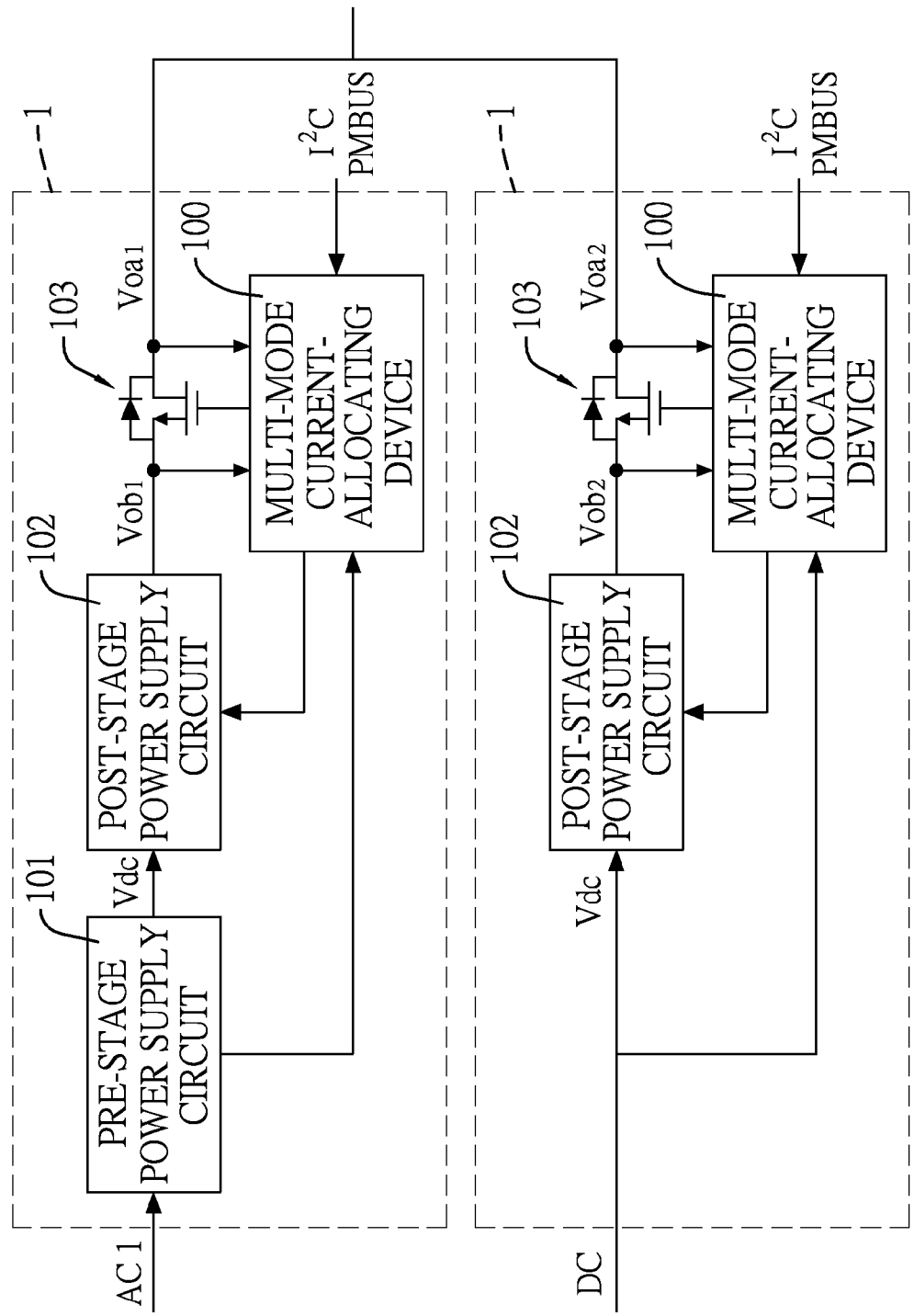
FIG. 5 is a functional block diagram of a power supply system having two parallel-connected power supply devices respectively connected to an AC power input and a DC power input in accordance with the present invention.

With reference to FIG. 5, one AC power AC1 and one DC power supply power to the two parallel-connected power supply devices. The DC power may be from a battery set or a solar panel. The power supply system can allocate its output current according to the supplied power capacity of the DC power. Generally, when each of two power supply devices 1 supplies 50% of the load current, the power supply device should be replaced when the power supply device 1 has be operated for 5 years. Such current-allocating method can be applicable to the life cycle of extended products of the power supply system. When the foregoing current-allocating method is adopted, the power supply system controls the power supply devices to respectively supply 80% and 20% of the load current constantly. Based on analysis of reliability and life cycle, the power supply device 1 supplying 80% of the load current needs to be replaced after 5 years while the power supply device 1 supplying 20% of the load current needs to be replaced after 6 to 7 years. If being subject to the current-sharing mode with each power supply device supplying 50% of the load current, the two power supply devices 1 need to be replaced at the same time. When the parallel-connected power supply devices operated under the current-allocating mode, one power supply device needs to be replaced at a time.

Figure 6:
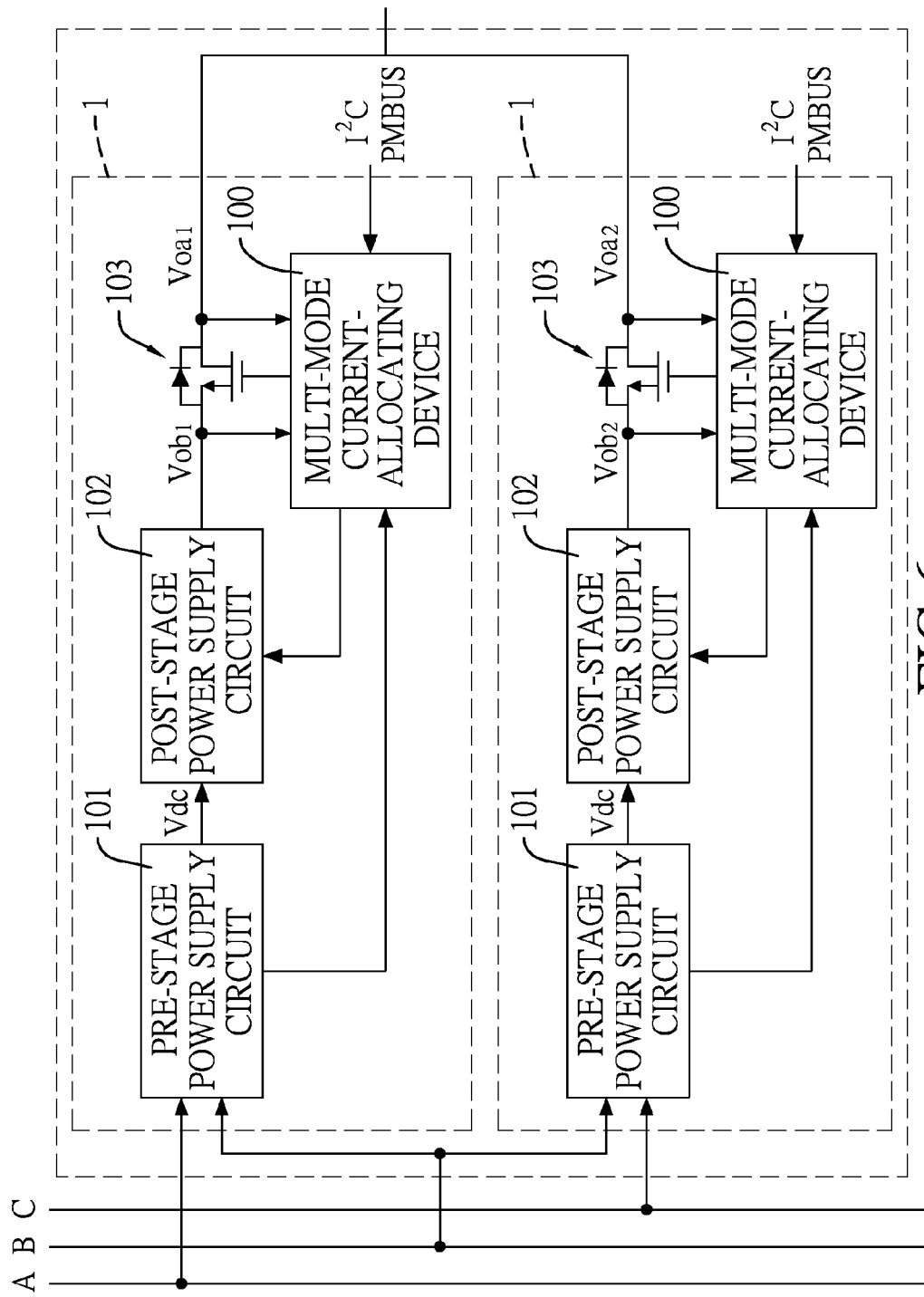
FIG. 6 is a functional block diagram of a power supply system connected to a three-phase AC power input in accordance with the present invention.

With reference to FIG. 6, the two power supply devices 1 can be connected in parallel to constitute a three-phase power supply system. If the two power supply devices 1 are arranged to have a symmetric layout and all input currents are balanced, i.e. Ia+Ib+Ic=0, balanced three-phase operation can be achieved. If the components of the power supply devices 1 differ slightly and the current-sharing mode is operated, the two power supply devices 1 may output power with slight difference to result in unbalanced three-phase operation. The unbalanced three-phase operation may cause distribution transformer saturation and large harmonic current. This is when the foregoing current-allocating method comes in handy. An AC voltage current detection circuit inside each power supply device 1 transmits detected messages to the current-allocating device 100 for the current-allocating device 100 to adjust the output current of the two power supply device 1 and keep the input currents in a balanced three-phase state.

C. Droop Current Sharing Mode

During the droop current sharing mode, the current-sharing bus switch 22 is turned off for the first adjustment current Iadj1 to become zero. As the first switch A1 is turned off, the control voltage VS2=0 and the second adjustment current Iadj2=0. A sensing current Isense is generated according to filtering of an output current, an inductor current or a primary side current. A control circuit generates a control voltage according to the sensing current Isense. The control voltage passes through the fourth switch B2 and is outputted to the voltage amplification circuit 41 for the output terminal of the voltage amplification circuit 41 to generate a droop control voltage Vdr in proportion to the control voltage. The relationship between the output voltage and the droop control voltage Vdr can be expressed as in Equations (7) and (8). The only difference is that the droop control voltage Vdr is directly generated by the sensing current Isense.

Figure 7:
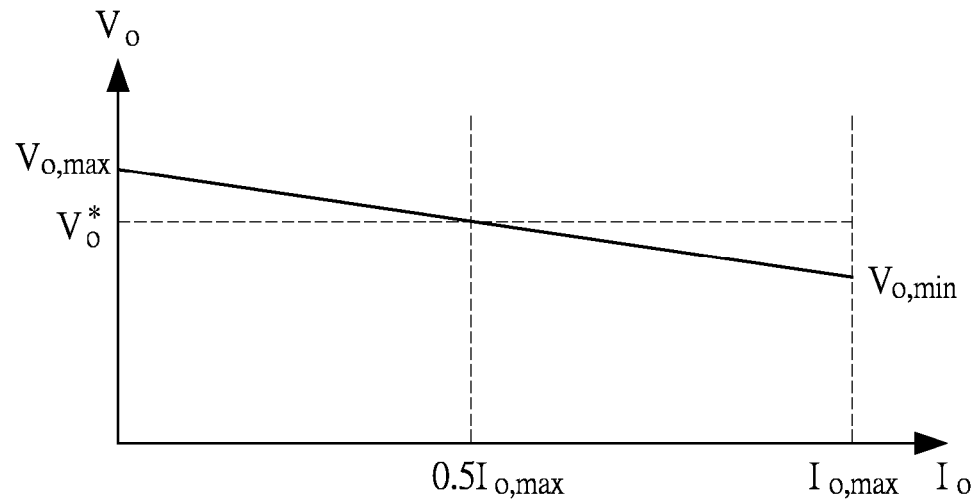
FIG. 7 is a characteristic curve showing voltage droop of output voltage of each single power supply device in FIG. 1 with respect to load current.

With reference to FIG. 7, an output voltage droop characteristic curve with respect to variation of load current is illustrated. Suppose that the highest output voltage of each power supply device 1 is Voai, max, the rated output voltage V*oai, and the lowest after-switch output voltage is Voai, min. According to Equations (2) and (7), Voai, max, V*oai, and Voai, min can be expressed by the following equations.

$$Voai = \frac{Vref}{W1} - Vdr \times \frac{W3}{W1} - Ioi \times Rds \times \frac{W2}{W1} \quad (9)$$

$$Voai, \max = \frac{Vref}{W1} \text{ when } Ioi = 0 \quad (10)$$

$$Voai, \min = \frac{Vref}{W1} - Vdr \times \frac{W3}{W1} - Ioi, \max \times Rds \times \frac{W2}{W1}. \quad (11)$$
for $Ioi = Ioi, \max$ The variation of the after-switch output voltage $\Delta Voai$ can be expressed as follows.

$$\Delta Voai = Voai, \max - Voai, \min = Vdr \times \frac{W3}{W1} + Ioi, \quad (12)$$
$$\max \times Rds \times \frac{W2}{W1}.$$

The second term on the right of Equation (12), which is far less than the first term in Equation (12), can thus be ignored, and Equation (12) becomes $$\Delta Voai = Voai, \max - Voai, \min \cong Vdr \times \frac{W3}{W1}. \quad (13)$$

Therefore, when the variation of the after-switch output voltage $\Delta Voai$ is given, the reference voltage command Vref can be obtained from Equation (7).

Besides the foregoing droop current sharing mode, the present invention can simultaneously applies the droop current sharing mode and the current-allocating mode, and the states of the switches can be configures as follows.

| | First switch A1 | Second switch A2 | Third switch B1 | Fourth switch B2 | Current-sharing bus switch 22 |
|---|---|---|---|---|---|
| Droop current sharing mode + Current-allocating mode | ON | OFF | OFF | ON | OFF |

Figure 8:
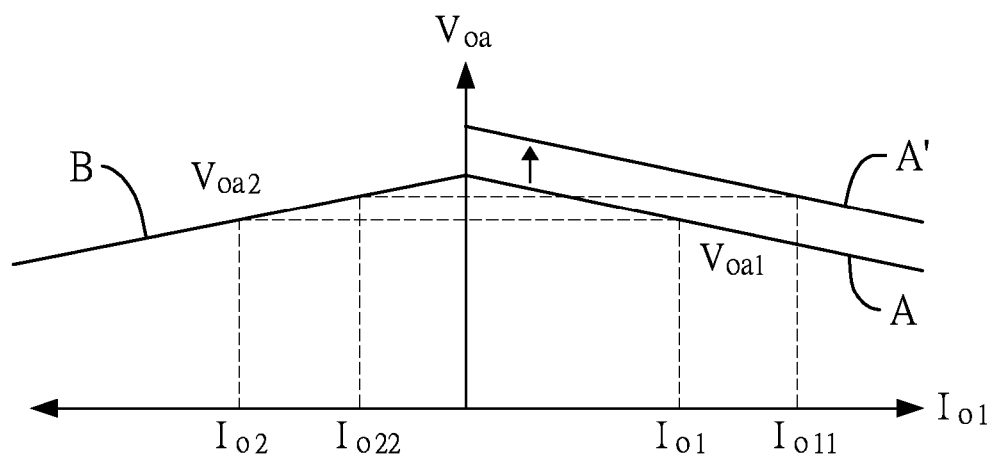
FIG. 8 is a back-to-back characteristic curve showing voltage droop of output voltage of the two parallel-connected power supply devices in FIG. 1 with respect to load current.

With reference to FIG. 8, when two power supply device 1 are connected in parallel and are both operated under the droop current sharing mode, the characteristic curves with respect to the output voltage and output current of the two power supply devices 1 can be arranged in a back-to-back fashion. The characteristic curves A and B respectively correspond to a first power supply device and a second power supply device. Operated under a regular droop current sharing mode, the two power supply devices share the load current and respectively output two equal current Io1 and Io2. When different power sources requirements and operation efficiency are considered, current allocation regarding the second adjustment current Iadj2 of the first power supply device can be activated, and the characteristic curve is shifted upwards to become the curve represented by A', and the first power supply device provides more output current to the load. The output currents of the first and second power supply devices become Io11 and Io22. The output current Io11 of the first power supply device increases and the output current of the second power supply device decreases. However, the total output current remains unchanged, that is, Io1+Io2=Io11+Io22, and the output voltage slightly increases. As a result, the droop current sharing mode and the current-allocating mode can be simultaneously applied.

Figure 9:
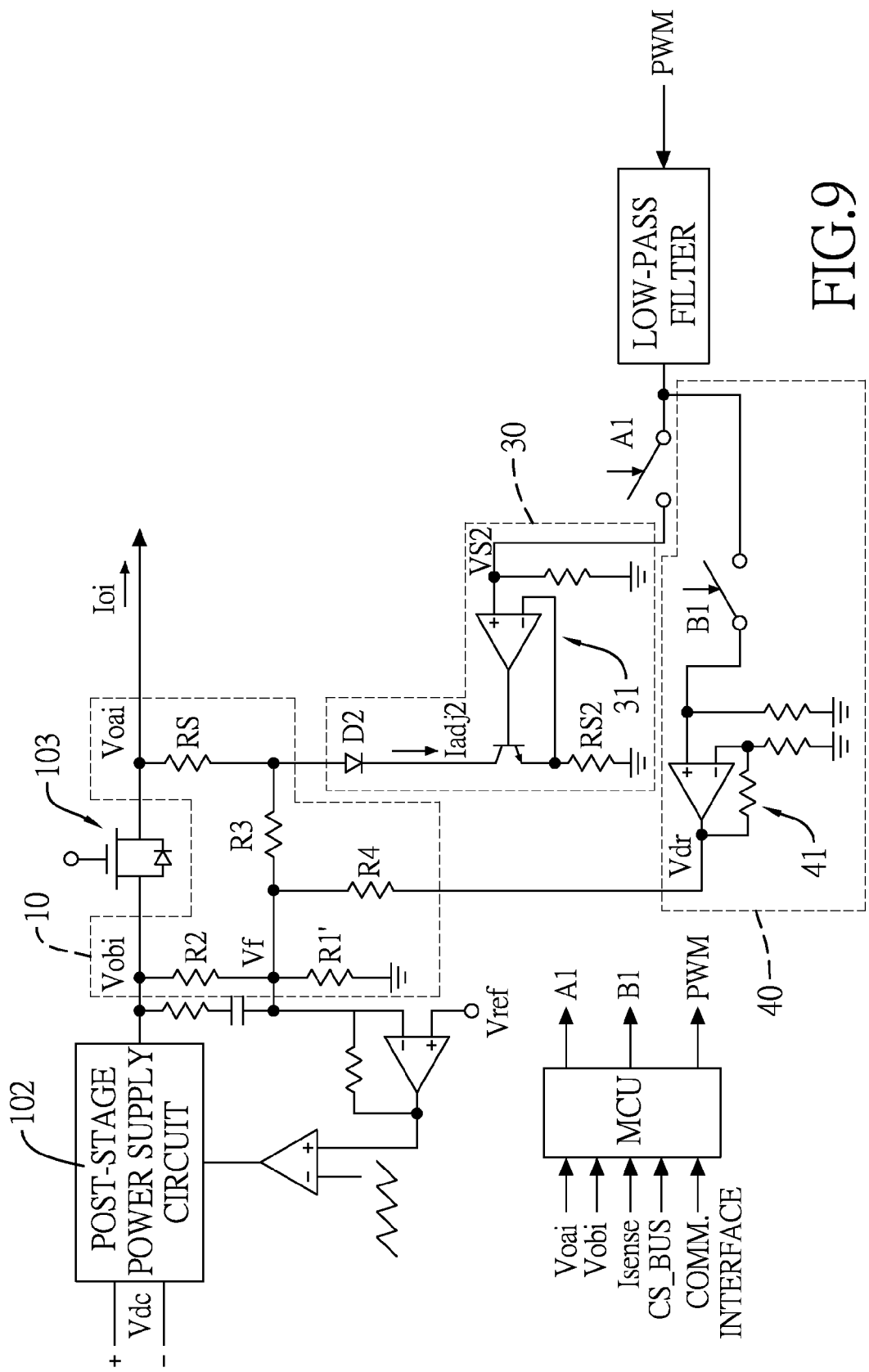
FIG. 9 is a circuit diagram of a second embodiment of a current-allocating device in each power supply device in FIG. 1.

With reference to FIG. 9, a second embodiment of a current-allocating device in accordance with the present invention has a current-allocating bypass circuit 30 and a droop current sharing control circuit 40. The MCU outputs a PWM control signal passing through a low-pass filter and converted into an analog control signal. The analog control signal passes through two switches A1 and B1 to become a first control voltage and a second control voltage, which are provided to the current-allocating bypass circuit 30 and the droop current sharing control circuit 40. In the present embodiment, upward adjustment and downward adjustment of the output voltage can be attained. Circuit operation of the present embodiment can be referred to that of the first embodiment, and is not repeated here.

Figure 10:
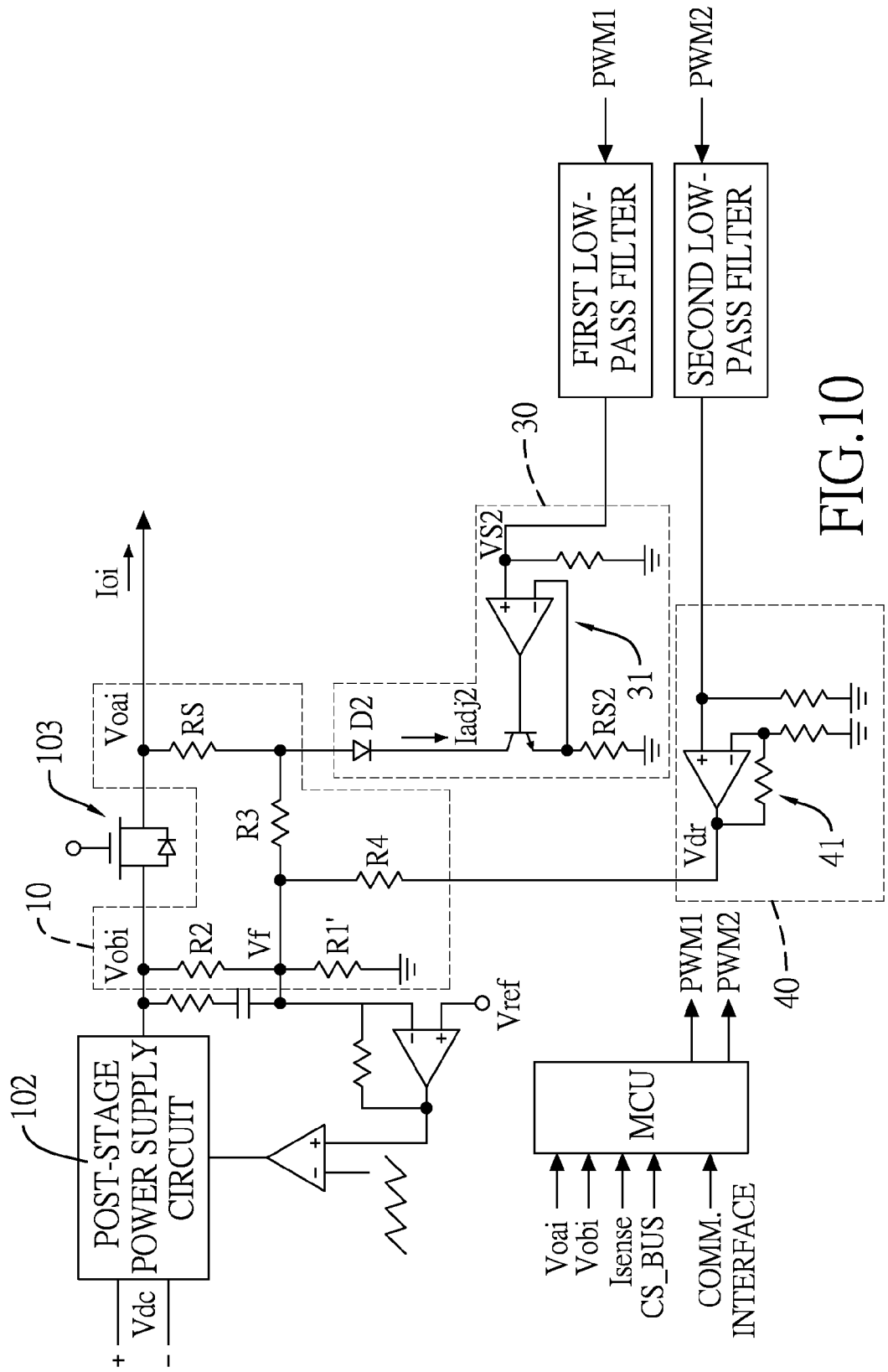
FIG. 10 is a circuit diagram of a third embodiment of a current-allocating device in each power supply device in FIG. 1.

With reference to FIG. 10, a third embodiment of a current-allocating device in accordance with the present invention is substantially the same as the second embodiment except that the MCU outputs two independent PWM control signals PWM1, PWM2. The two PWM control signals PWM1, PWM2 respectively pass through a first filter and a second filter to generate a first control voltage and a second control voltage. The timing of outputting the first control voltage and the second control voltage is solely determined by the MCU. Hence, the switches A1, B2 are not required in the present embodiment.

Figure 11:
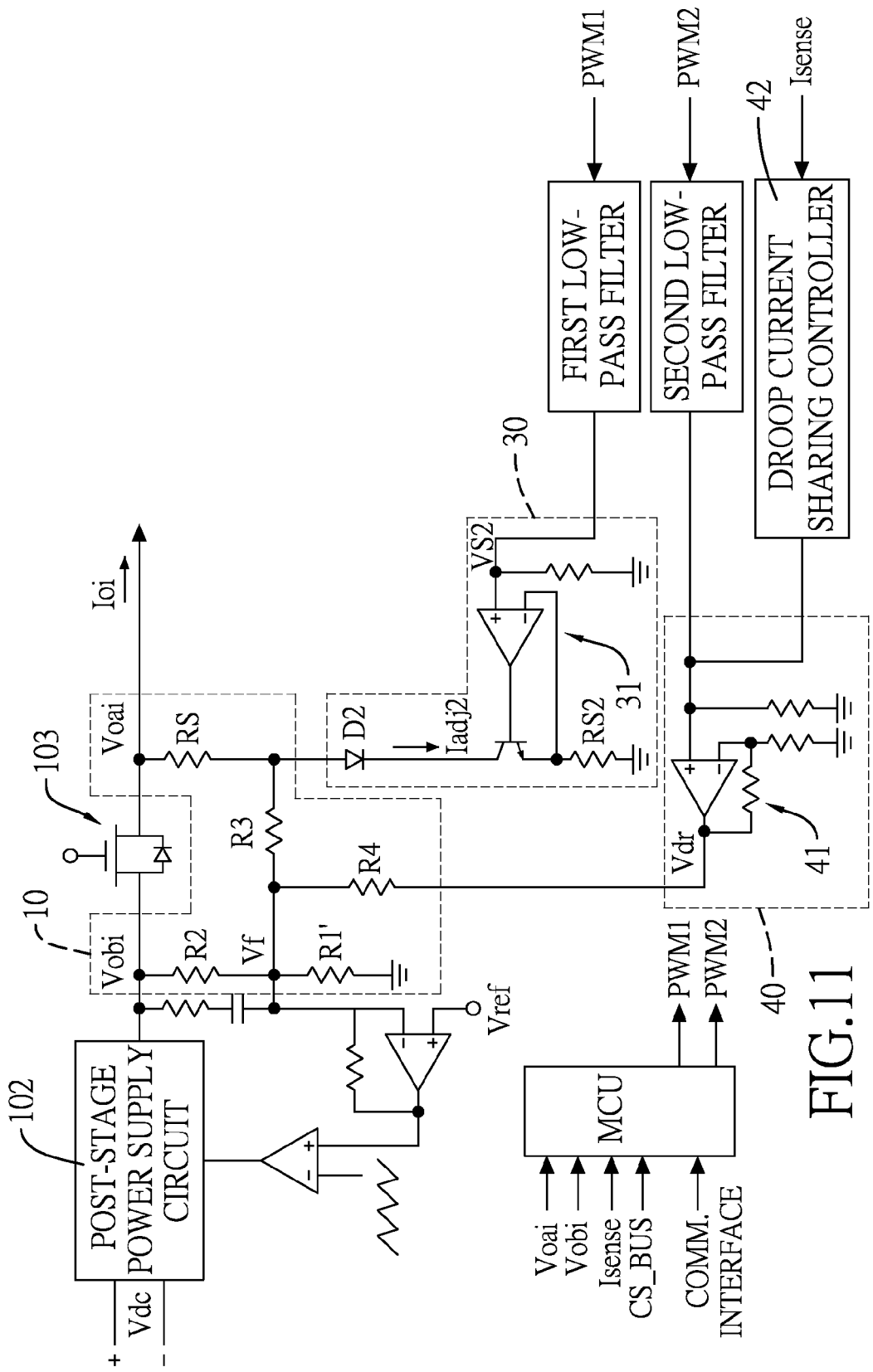
FIG. 11 is a circuit diagram of a fourth embodiment of a current-allocating device in each power supply device in FIG. 1.
Figure 12:
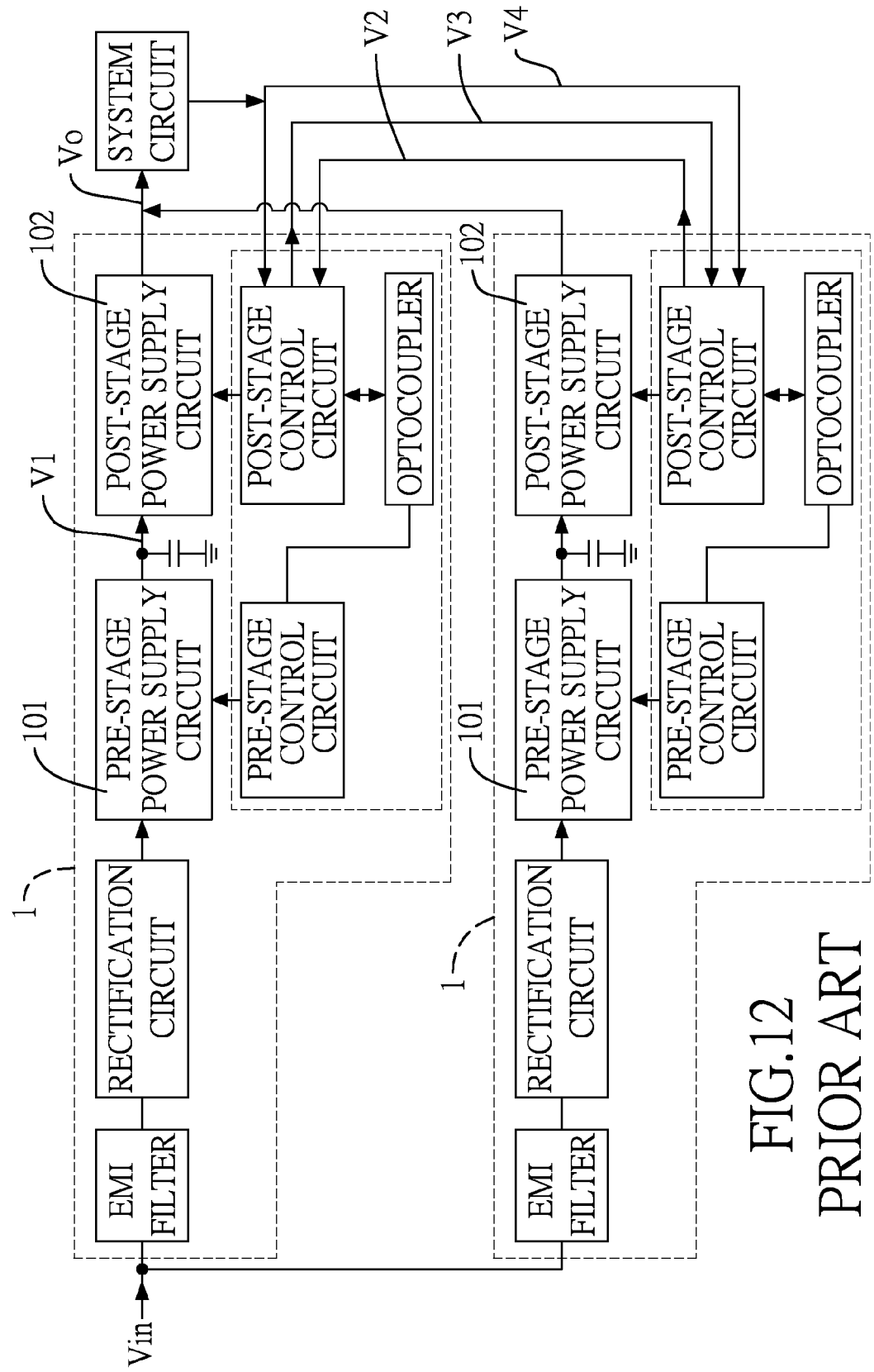
FIG. 12 is a functional block diagram of a conventional distributive power supply system.

With reference to FIG. 11, the droop current sharing control circuit 40 further has a droop current sharing controller 42 connected to the current-allocating bypass circuit 30 for combining the function of voltage adjustment required for the execution of the droop current sharing mode.

For all foregoing embodiments, the MCU has a digital-to-analog (D/A) conversion circuit embedded therein, and is able to directly output the required analog control voltage without using the low-pass filter for D/A conversion.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A multi-mode current-allocating device serving to control a DC (direct current) to DC converter of a power supply device, the multi-mode current-allocating device comprising:
    a current switch connected to an output terminal of the DC to DC converter, wherein an output voltage before passing through the current switch is defined as a before-switch output voltage, and another output voltage after passing through the current switch is defined as an after-switch output voltage;
    a feedback circuit connected between the output terminal and an input terminal of the DC to DC converter, and having:
        an internal feedback circuit having:
            a first resistor; and
            a second resistor connected in series to the first resistor, wherein a first end of the second resistor is connected to the before-switch output voltage, and a series-connected node between the first resistor and the second resistor is a voltage-dividing feedback node having a voltage-dividing feedback voltage;
        an external feedback circuit having:
            a far-end feedback resistor, wherein a first end of the far-end feedback resistor is connected to the after-switch output voltage; and
            a third resistor, wherein a first end of the third resistor is connected to a second end of the far-end feedback resistor, and a second end of the third resistor is connected to the voltage-dividing feedback resistor;
    a current-allocating bypass circuit having:
        a second diode, wherein an anode of the second diode is connected to the second end of the far-end feedback resistor and the first end of the third resistor; and
        a second bypass amplification circuit, wherein an output terminal of the second bypass amplification circuit is connected to a cathode of the second diode, and an input terminal of the second bypass amplification circuit receives a first control voltage;
    a droop current sharing control circuit having:
        a fourth resistor, wherein one end of the fourth resistor is connected to the voltage-dividing feedback node of the feedback circuit; and
        a voltage amplification circuit, wherein an output terminal of the voltage amplification circuit is connected to the other end of the fourth resistor, and an input terminal of the voltage amplification circuit receives a second control voltage for the voltage amplification circuit to output a droop control voltage to the feedback circuit through the fourth resistor; and
    a microcontroller unit (MCU), wherein an input terminal of the MCU is connected to the before-switch output voltage, the after-switch output voltage and a communication interface, and the MCU provides the first control voltage and the second control voltage.

2. The multi-mode current-allocating device as claimed in claim 1, wherein the MCU outputs two independent control signals as the first control voltage and the second control voltage.

3. The multi-mode current-allocating device as claimed in claim 2, further comprising:
    an active current-sharing control circuit having:
        a first diode, wherein an anode of the first diode is connected to the second end of the far-end feedback resistor and the first end of the third resistor;
        a current-sharing controller;
        a first bypass amplification circuit connected between an anode of the first diode and an output control voltage of the current-sharing controller; and
        a current-sharing bus switch, wherein one terminal of the current-sharing bus switch is connected to the current-sharing controller and another terminal of the current-sharing bus switch is adapted to connect to a current-sharing bus.

4. The multi-mode current-allocating device as claimed in claim 3, wherein the droop current sharing control circuit further has a droop current sharing controller connected to the input terminal of the voltage amplification circuit, and generating a droop current sharing control signal according to a sensing current, and the droop current sharing control signal is inputted to the voltage amplification circuit for the voltage amplification circuit to output the droop control voltage.

5. The multi-mode current-allocating device as claimed in claim 2, wherein the two control signals outputted from the MCU respectively pass through two low-pass filters to generate the first control voltage and the second control voltage.

6. The multi-mode current-allocating device as claimed in claim 1, wherein the MCU outputs a control signal passing through two switches to generate the first control voltage and the second control voltage.

7. The multi-mode current-allocating device as claimed in claim 6, further comprising:
    an active current-sharing control circuit having:
        a first diode, wherein an anode of the first diode is connected to the second end of the far-end feedback resistor and the first end of the third resistor;
        a current-sharing controller;
        a first bypass amplification circuit connected between an anode of the first diode and an output control voltage of the current-sharing controller; and
        a current-sharing bus switch, wherein one terminal of the current-sharing bus switch is connected to the current-sharing controller and another terminal of the current-sharing bus switch is adapted to connect to a current-sharing bus.

8. The multi-mode current-allocating device as claimed in claim 7, wherein the droop current sharing control circuit further has a droop current sharing controller connected to the input terminal of the voltage amplification circuit, and generating a droop current sharing control signal according to a sensing current, and the droop current sharing control signal is inputted to the voltage amplification circuit for the voltage amplification circuit to output the droop control voltage.

9. The multi-mode current-allocating device as claimed in claim 6, wherein the control signal outputted from the MCU passes through a low-pass filter and then passes through the two switches.

10. The multi-mode current-allocating device as claimed in claim 1, further comprising:
    an active current-sharing control circuit having:
        a first diode, wherein an anode of the first diode is connected to the second end of the far-end feedback resistor and the first end of the third resistor;
        a current-sharing controller;
        a first bypass amplification circuit connected between an anode of the first diode and an output control voltage of the current-sharing controller; and
        a current-sharing bus switch, wherein one terminal of the current-sharing bus switch is connected to the current-sharing controller and another terminal of the current-sharing bus switch is adapted to connect to a current-sharing bus.

11. The multi-mode current-allocating device as claimed in claim 10, wherein the droop current sharing control circuit further has a droop current sharing controller connected to the input terminal of the voltage amplification circuit, and generating a droop current sharing control signal according to a sensing current, and the droop current sharing control signal is inputted to the voltage amplification circuit for the voltage amplification circuit to output the droop control voltage.

12. The multi-mode current-allocating device as claimed in claim 10, wherein the MCU is adapted to connect to the current-sharing bus.

\* \* \* \* \*